R. N. WOODMAN.
CONTROL SWITCH MECHANISM.
APPLICATION FILED JULY 15, 1916.
1,277,520.
Patented Sept. 3, 1918.
3 SHEETS—SHEET 1.
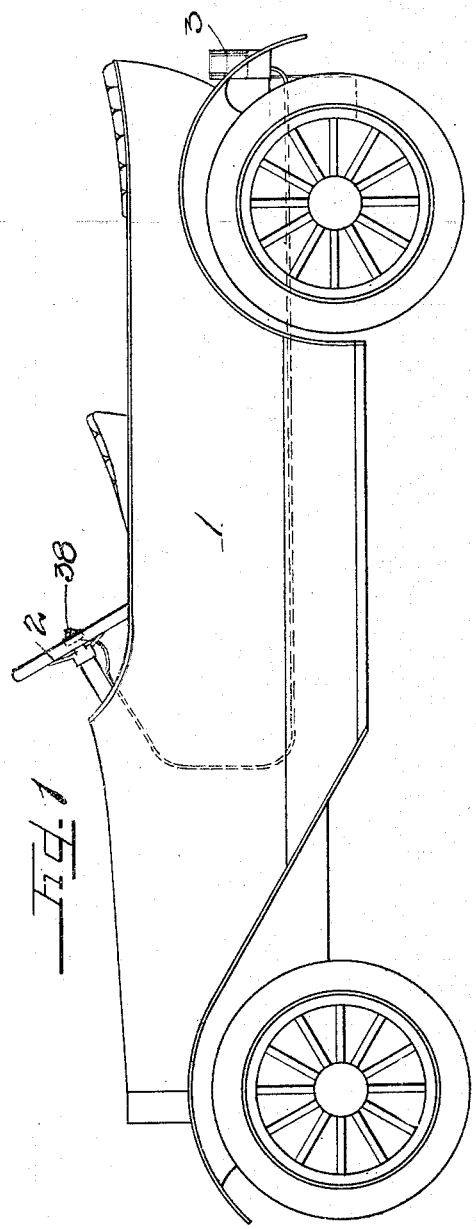
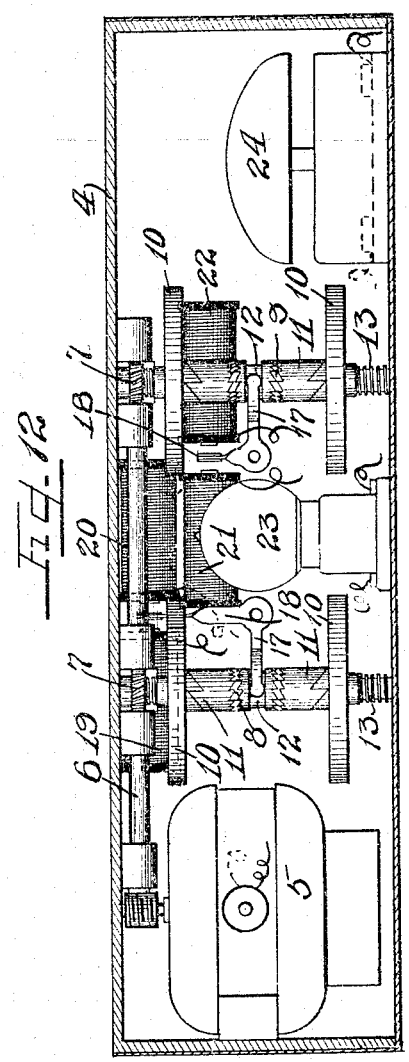

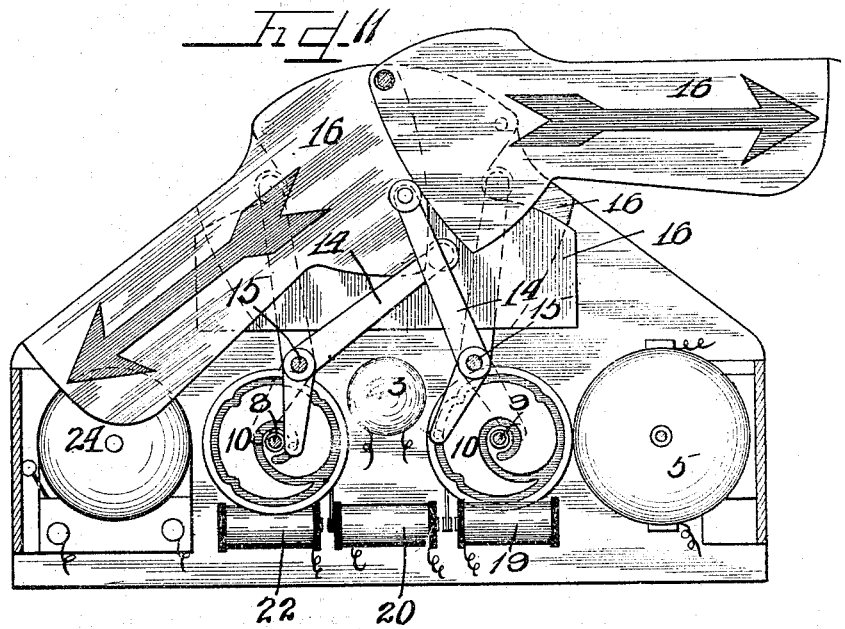
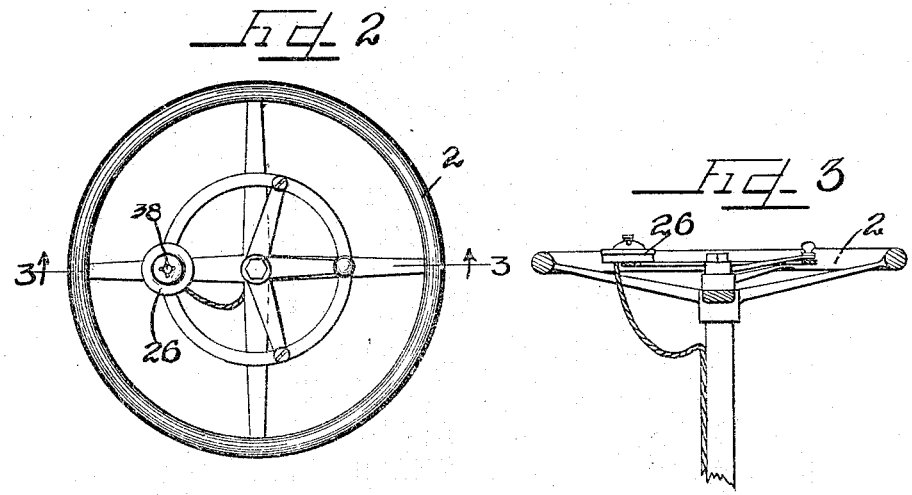
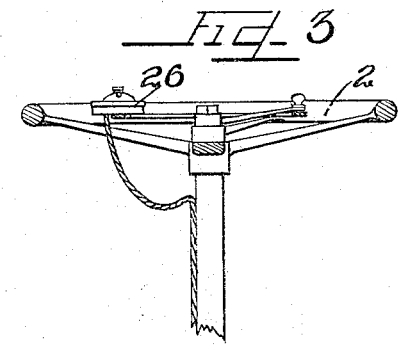

R. N. WOODMAN.
CONTROL SWITCH MECHANISM.
APPLICATION FILED JULY 15, 1916.
1,277,520.
Patented Sept. 3, 1918.
3 SHEETS—SHEET 3.
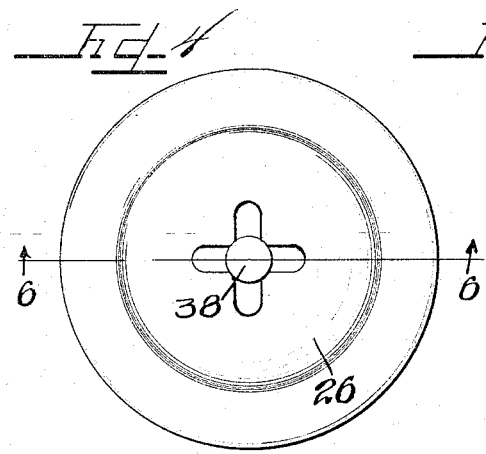
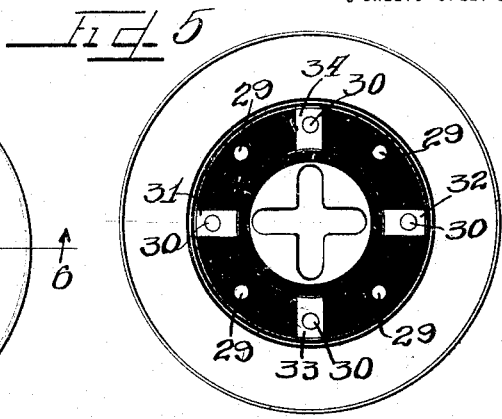
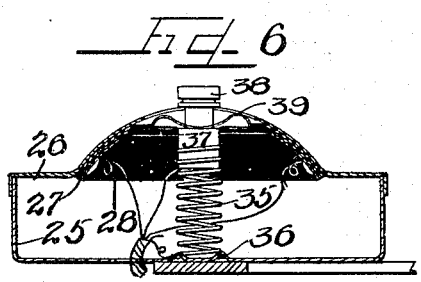
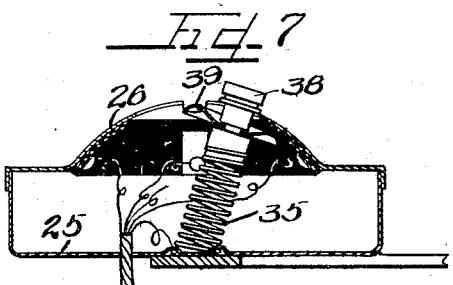
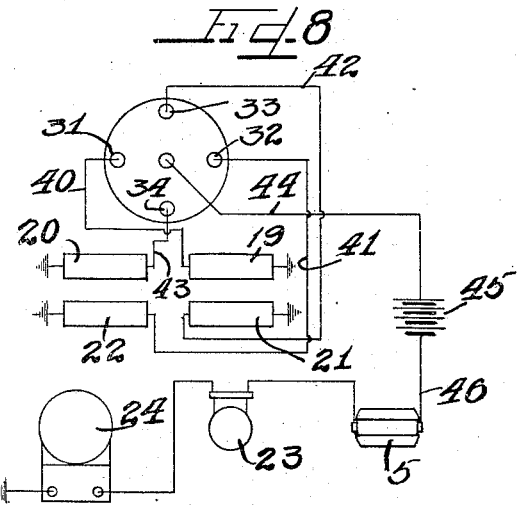
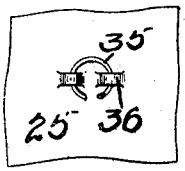
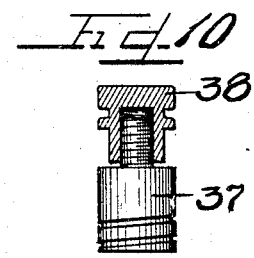
Witnesses
Inventor
Richard N. Woodman

UNITED STATES PATENT OFFICE.

RICHARD N. WOODMAN, OF CHICAGO, ILLINOIS, ASSIGNOR OF ONE TWENTY-FIFTH TO WILLIAM N. HOLMES, OF CHICAGO, ILLINOIS, AND ONE-FIFTIETH TO CHARLES HEDLER, OF PARK RIDGE, ILLINOIS.

CONTROL SWITCH MECHANISM.

1,277,520.   Specification of Letters Patent.   Patented Sept. 3, 1918

Application filed July 15, 1916. Serial No. 109,485.

*To all whom it may concern:*

Be it known that I, RICHARD N. WOODMAN, a citizen of the United States, and a resident of the city of Chicago, in the county of Cook and State of Illinois, have invented certain new and useful Improvements in Control Switch Mechanism; and I do hereby declare that the following is a full, clear, and exact description of the same, reference being had to the accompanying drawings, and to the numerals of reference marked thereon, which form a part of this specification.

This invention relates to an improved type of control signal for that type of rear signal used on motor cars such as disclosed in my co-pending application for patent for automobile rear signal, executed and filed of even date herewith. The signal operated by the control device embodying the principles of this invention, as shown consists of pairs of signal arms adapted to be swung upwardly and given a waving movement to indicate a right or left hand turn or a stop and backing movement, thereby signaling the driver of a vehicle following of an intention to change the course or operation of the vehicle upon which the signal device is mounted. The control mechanism for this device is designed with four possible movements to bring into operation any one of the signaling arms or plates as the case may be and maintain the same in signaling position until the control mechanism is returned to normal or control position under the hand of the operator.

It is an object of this invention therefore to construct a controlling device for a signal mechanism, embracing means movable to any one of a plurality of positions to close any one of a number of electric circuits desired according to the position into which the means is moved, to bring into operation and actuate the signaling mechanism at the rear of the motor car.

It is also an object of this invention to construct a selective control switch mechanism for an automobile capable of being moved into any one of a plurality of positions to close electric circuits for operating different mechanisms of the signaling device, and a switch mechanism which remains in any adjusted position until manually shifted therefrom.

It is also an object of this invention to construct a switch mechanism for an automobile rear signal embracing a resilient switch contact member actuatable through a slotted cup member into any one of a number of positions to close different circuits to actuate different mechanisms of the rear signal.

It is furthermore an important object of this invention to construct a controlling switch mechanism for a signaling device embracing a resiliently mounted universally movable switch member adapted to be guided in its different movements by slots in an insulated cup member conveniently attached upon the steering wheel of a motor car to close different circuits for a signaling device to actuate the different mechanism thereof according to the signal desired.

It is finally an object of this invention to construct an improved switch mechanism simple in construction and operation, easily actuatable to effect closure of the electrical circuits to actuate the particular signaling mechanism desired.

The invention (in a preferred form) is illustrated in the drawings and hereinafter more fully described.

In the drawings:

Figure 1 is a side elevation of a motor car equipped with a device embodying the principles of my invention.

Fig. 2 is an exterior top plan view of the selective switch device mounted on the steering wheel of the motor car.

Fig. 3 is a detail section taken on line 3—3 of Fig. 2, with parts shown in elevation.

Fig. 4 is an enlarged top plan view of the selective switch mechanism.

Fig. 5 is an interior bottom plan view of the cover member of said switch mechanism.

Fig. 6 is a detail section taken on line 6—6 of Fig. 4, with parts shown in elevation.

Fig. 7 is a view similar to Fig. 6, illustrating the switch member in its adjusted position.

Fig. 8 is a wiring diagram.

Fig. 9 is a detail view illustrating the means of the connection of the resilient switch button to the base of the switch casing.

Fig. 10 is a detail view partly in section and partly in elevation of the switch button.

Fig. 11 is an enlarged rear elevation of the signaling device with the cover plate detached and showing the interior mechanism.

Fig. 12 is a horizontal section showing the actuating mechanism for the signaling mechanism.

As shown in the drawings:

The reference numeral 1, indicates as a whole a motor car, having a steering wheel 2, and with a signal device denoted as a whole by the reference numeral 3, mounted at the rear end of the vehicle. The signaling mechanism briefly described consists of a casing 4, within which an electric motor 5, is mounted, geared to drive the shaft 6, and said shaft 6, is provided with worms to drive worm wheels 7, which are secured upon transverse shafts 8 and 9, respectively. Slidably journaled on said shafts 8 and 9, are cam wheels 10, four in number, two on each of said shafts, and the two hubs on each thereof are normally in engagement with the toothed ends of clutch driving members 11, which are rotatable but not slidable upon said respective shafts 8 and 9.

Slidably mounted between said clutch members 11, and feathered upon said respective shafts 8 and 9, are jaw clutch collars or members 12, adapted to be thrown into engagement with either one of the members 11 on either side thereof to drive the same, and transfer a drive to one of the respective cam wheels 10. When a drive is imparted to one of the respective cam wheels 10, the same slides outwardly upon the shaft due to its angled toothed connection with the clutch member, against the compression of its spring 13, but not entirely out of engagement with its clutch member 11. By such movement of a cam wheel 10, the cam grooves in the surface thereof shown in Fig. 11, engage a pin on the lower end of one of the bell cranks 14, four in number, journaled upon rods 15, secured transversely of the casing above the respective shafts 8 and 9. Said respective bell cranks 14, at their upper ends bear against the inner edges of signal arms or plates 16, four in number, two provided with directional arrows as shown in Fig. 11, and the other two shown in partially concealed position therebehind having other signal characters not shown. Any of the signal arms or plates may be swung upwardly dependent upon which one of the bell cranks 14, is actuated, and this depends upon which one of the cam wheels 10, is brought into driving engagement for the purpose, by the selective operation of the respective engaging clutch members 12, either one way or the other. Bell cranks each having a yoke arm 17, engaging one of said clutch members 12, are provided pivoted within the casing and each bell crank has a tail lever or armature bar arm 18, that of one of the bell cranks adapted to be controlled by solenoids 19 and 20 and the tail of the other of said bell cranks controlled by solenoids 21 and 22, respectively. Thus the shifting of one or the other of the clutch members 12, in either one direction or the other may be effected, depending upon which of the solenoids 19, 20, 21 or 22, is energized. Also mounted within the casing 4, is an electric bulb 23, and electric bell alarm 24, which are in series with the motor 5, so whenever the circuit to the motor 5, is closed the lamp is illuminated and the bell is sounded.

This invention resides in the particular selective switch mechanism for controlling the electric circuits to the solenoids, electric motor, lamp and audible alarm signal, and consists of a cup shaped casing or base 25, adapted to be conveniently secured upon the steering wheel in any suitable manner, convenient for actuation by the operator of the vehicle. Fitted over said base or cup member 25, is a rounded cover or cap member 26, provided with two insulating shells 27 and 28 forming an insulating lining for the cover member. Said shells 27 and 28 are riveted to the cover member 26 by rivets 29, and rivets 30 serve to secure contact members 31, 32, 33 and 34 to the inner surface of said shell 28 before the shells 27 and 28, are mounted within the cover member 26. The shell 27, acts as a means for insulating the rivets 30, from the cover member. Slots arranged in cross shape are provided through said cover member 26 and associated shells for a purpose hereinafter pointed out.

The movable switch closure mechanism within the casing 25—26, consists of a coiled compression spring 35, the lower end of which is engaged through eyes 36, struck upwardly from the bottom of the cup member 25, and the upper end of which is engaged around in grooves provided in a pin 37. A threaded extension of reduced diameter is formed on the upper end of the pin 37, and engaged thereon is a switch button 38, projecting through the cross-shaped slots whereby the upper portion is disposed upon the exterior of the cover member 26. Said switch button 38 serves to clamp a resilient disk contact closure member 39, upon said pin 37, whereby the respective electric contacts 31, 32, 33 and 34, may be closed. The wire 40, is connected to the terminal 31, and leads to the grounded solenoid 19, another wire 41, is connected to the terminal 32, and leads to the grounded solenoid 22, another wire 42, is connected to the terminal 33, and leads to the grounded solenoid 21, and another wire 43, is connected to the terminal 34, and leads to the grounded solenoid 20. Another wire 44, is connected to the coiled spring 35, of the switch button and leads to a source of E. M. F. 45, from which another wire 46, leads to the motor 5. The motor 5, is connected in series with the lamp 23, and electric bell 24, which is grounded.

The operation is as follows:

The switch button 38, may be moved in the cross shaped slots of the switch casing into any one of four circuit closing positions, that is forwardly or rearwardly or to the left or to the right, as desired, and when centrally disposed is in neutral position such as shown in Fig. 4, so that all of the circuits are open. Should the operator intend to turn to the left, the switch button 38, is moved to the left in the transverse portion of the cross-shaped slots whereby the solenoid 19, is energized and clutch mechanisms are operated to throw up the signal arm 16, bearing the arrow directed to the left, and similarly, when a right turn is to be made, the switch button is thrown to the right to throw up the right hand signal arm 16. Similarly, shifting the switch button 38, either forwardly or rearwardly in the cross shaped slots, serves to actuate the arms which may indicate a stop or backing movement of the vehicle upon which the signal is attached. Owing to the construction of the switch element, the same retains any shifted position into which the same may be moved, so that after the desired movement of the vehicle has been made, the driver may conveniently return the switch button to neutral position whereupon the signal devices will operate to fall into concealed position within the casing of the device. It is obvious that the lamp 23, may be on an independent circuit so that it may be utilized as a tail light if desired, but in any event, it serves to cast its illuminating rays upwardly through the opened slot in the top of the casing to light up a signal arm or plate in use.

I am aware that various details of construction may be varied through a wide range without departing from the principles of this invention and I therefore do not purpose limiting the patent granted otherwise than necessitated by the prior art.

I claim as my invention:

1. In a selective switch control mechanism for a signal device, a casing, a cap fitted thereon, an insulating shell secured within said cap, a second insulating shell concentric with and disposed within said first mentioned shell and secured to said cap, a plurality of contact members secured to said second insulating shell and insulated from said cap by said first mentioned insulating shell, and a universally movable switch closure member mounted within said casing and projecting through said cap adapted for closing any one of said switch contacts.

2. In a switch of the class described, a casing, a cover thereon, a contact element therein, a universally movable switch element secured to said casing adapted to hold said contact element in any fixed position, an insulating shell within said cover, a plurality of switch contact members mounted thereon adapted to be closed by said switch element, and a second insulating shell within said cover acting as a means to insulate said contact members from said cover.

In testimony whereof I have hereunto subscribed my name in the presence of two subscribing witnesses.

RICHARD N. WOODMAN.

Witnesses:
　CHARLES W. HILLS, Jr.,
　EARL M. HARDINE.